United States Patent
Gamishev et al.

(10) Patent No.: US 12,425,190 B2
(45) Date of Patent: Sep. 23, 2025

(54) METHOD FOR PROTECTING A NETWORK ACCESS PROFILE AGAINST CLONING

(71) Applicant: Orange, Issy-les-Moulineaux (FR)

(72) Inventors: Todor Gamishev, Chatillon (FR); Laurent Coureau, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 237 days.

(21) Appl. No.: 18/003,583

(22) PCT Filed: Jun. 16, 2021

(86) PCT No.: PCT/FR2021/051084
§ 371 (c)(1),
(2) Date: Dec. 28, 2022

(87) PCT Pub. No.: WO2022/003266
PCT Pub. Date: Jan. 6, 2022

(65) Prior Publication Data
US 2023/0370247 A1    Nov. 16, 2023

(30) Foreign Application Priority Data

Jun. 29, 2020   (FR) ........................................ 2006832

(51) Int. Cl.
*H04L 29/00*   (2006.01)
*H04L 9/08*    (2006.01)
*H04L 9/40*    (2022.01)

(52) U.S. Cl.
CPC .......... *H04L 9/0819* (2013.01); *H04L 63/102* (2013.01)

(58) Field of Classification Search
CPC ............................. H04L 9/0819; H04L 63/102
(Continued)

(56) References Cited

U.S. PATENT DOCUMENTS

2016/0099923 A1   4/2016  Golla et al.
2016/0241537 A1*  8/2016  Cha .................. H04L 63/20
(Continued)

OTHER PUBLICATIONS

English translation of the Written Opinion of the International Searching Authority dated Aug. 16, 2021 for corresponding International Application No. PCT/FR2021/051084, filed Jun. 16, 2021.
(Continued)

*Primary Examiner* — Jeffrey C Pwu
*Assistant Examiner* — Michael D Anderson
(74) *Attorney, Agent, or Firm* — David D. Brush; Westman, Champlin & Koehler, P.A.

(57) ABSTRACT

A method for protecting a network access profile against cloning. A first mobile equipment includes a first security module having the network access profile. A second mobile equipment is designed to receive the network access profile and includes a second security module. The first and second security modules are designed to establish a logic communication channel with each other. The method is implemented by the first security module and includes: generating a secret key; using the secret key to encrypt a data packet associated with the network access profile; sending the encrypted packet to the second security module through the logic communication channel; receiving, from the second security module, an acknowledgement of a correct receipt of the encrypted data packet; deleting the data packet associated with the network access profile; and then sending the secret key to the second security module through the logic communication channel.

10 Claims, 1 Drawing Sheet

(58) Field of Classification Search
USPC .......................................................... 713/171
See application file for complete search history.

(56) References Cited

U.S. PATENT DOCUMENTS

2017/0142121 A1    5/2017  Lee et al.
2017/0346625 A1*  11/2017  Yan ...................... G06F 21/602

OTHER PUBLICATIONS

International Search Report dated Aug. 16, 2021 for corresponding International Application No. PCT/FR2021/051084, filed Jun. 16, 2021.
Written Opinion of the International Searching Authority dated Aug. 16, 2021 for corresponding International Application No. PCT/FR2021/051084, filed Jun. 16, 2021.

* cited by examiner

METHOD FOR PROTECTING A NETWORK ACCESS PROFILE AGAINST CLONING

CROSS-REFERENCE TO RELATED APPLICATIONS

This Application is a Section 371 National Stage Application of International Application No. PCT/FR2021/051084, filed Jun. 16, 2021, which is incorporated by reference in its entirety and published as WO 2022/003266 A1 on Jan. 6, 2022, not in English.

FIELD OF THE DISCLOSURE

The present invention relates to the general field of telecommunications. It more specifically relates to a method for protecting a network access profile against cloning.

BACKGROUND OF THE DISCLOSURE

It has a particularly beneficial application within the scope of the increasingly widespread use of on-board, and therefore irremovable, security modules in mobile equipment for the general public, such as a mobile terminal or a tablet. For example, when purchasing new mobile equipment, the invention allows a user to transfer their access profile to this new equipment in a user-friendly manner, while providing the operator with all the security guarantees required for their network, in particular that of never having two identical access profiles simultaneously active in their network. "Active" means adapted to access the network of the operator.

The on-board SIM card standards developed for the GSMA, or the "eSIM" of the "eUICC" ("embedded Universal Integrated Circuit Card") type, and the SSP ("Smart Secure Platform") developed by ETSI, do not allow an access profile to be securely transferred to a network of an operator directly from a first mobile equipment to a second mobile equipment. Preventing the cloning of profiles is a major obstacle to the provision of such a mechanism. Indeed, protecting profiles against cloning is a crucial security challenge for network operators.

However, such a profile transfer mechanism can prove useful. Indeed, subscribers commonly acquire new mobile equipment. Therefore, it is only natural to contemplate offering them a simple and user-friendly way to transfer their access profile to the active network from one equipment to another, without direct interaction with the operator, whether this is on a terminal-to-terminal basis, through an agency, or remotely via the Internet or by telephone, while guaranteeing that the operator is protected against profile cloning and thus guaranteeing the security of their network.

SUMMARY

One of the aims of the invention is to overcome any shortcomings/disadvantages of the prior art, and/or to provide improvements thereto.

To this end, the invention proposes a method for protecting a network access profile against cloning, a first mobile equipment comprising a security module, called "first security module", said first security module comprising said network access profile, a second mobile equipment being designed to receive said network access profile, said second mobile equipment comprising a security module, called "second security module", with said first security module, and respectively said second security module, being designed to establish a logic communication channel with the second security module, and respectively the first security module, said method comprising the following steps, implemented by the first security module:
generating a secret key;
encrypting, by means of said secret key, a data packet associated with the network access profile, and sending said encrypted packet to the second security module through the logic communication channel;
receiving an acknowledgement of receipt from the second security module representing the correct reception of said encrypted data packet;
deleting the data packet associated with the network access profile, then sending the secret key to the second security module through the logic communication channel.

The method described provides a network operator with the guarantee that two identical and active access profiles do not exist in their network, in other words adapted to access the network. Indeed, the method guarantees that, when transferring a network access profile from a first mobile equipment to a second mobile equipment, the network access profile transferred to the second mobile equipment can only become active from the moment when the access profile is deleted from the first mobile equipment. The method provides the operator with a solution against the cloning of network access profiles. Indeed, the network access profile and secret key pair that allows it to be encrypted and/or decrypted is always present at the most in a single security module. Thus, at no point can a clone of the decrypted access profile in a security module co-exist with the decrypted profile itself in another security module. Moreover, it is impossible to successfully carry out an attack against the two mobile equipments and the two security modules in order to attempt to clone the network access profile, by causing, for example, a fault, such as a reset, in either one of the terminals and their respective security element.

The security of this method, which involves security module-to-security module exchanges, relies on the security of the security module and not on the security of the mobile equipment. The risks of an attack when implementing the transfer method are thus limited, with the security modules offering a high level of security by design.

Advantageously, the method comprises the following steps, implemented by the second security module:
receiving an encrypted data packet associated with the network access profile;
sending an acknowledgement of receipt acknowledging the correct reception of the encrypted packet;
receiving the secret key;
decrypting the encrypted data packet by means of the received secret key.

The steps described herein correspond to the steps implemented by the second mobile equipment and its associated security module.

In one embodiment, the logic communication channel is a secure channel.

In this embodiment, the logic communication channel established between the security module of the first mobile equipment and the security module of the second mobile equipment is a secure channel, in other words it offers a set of security procedures based on proven cryptographic algorithms. There is mutual authentication between the two security modules when establishing the secure logic communication channel. This mutual authentication, which is based on the public key certificates respectively stored in each of the security modules, guarantees that each of the security modules dialogues with an authentic module. Moreover, the channel established between the two security modules is encrypted. Thus, a pirate who has taken control, for example, of one of the mobile equipments and who would see the data circulating over the channel, would be unable to interpret this data. For example, they would not be able to access the transmitted encryption key that is needed to decrypt the encrypted transferred access profile. This security offers the operator an additional guarantee: an attacker cannot obtain the network access profile and thus have a clone of the profile.

Finally, securing the channel offers protection against "Man In The Middle" attacks, during which an attacker, positioned between two equipments, for example, in this case the two security modules, listens to the communication channel and gathers sensitive information.

In one embodiment, the secret key is generated in accordance with a method for generating keys in a security module ("On Board Key Generation") integrated in the first security module.

In this embodiment, the encryption key is a random key generated by means of a method integrated in the security module. This method for generating keys is preferred by the operator since it offers the possibility of being integrated into the security module as an additional security guarantee.

In another embodiment, the secret key is generated by applying a key diversification algorithm, stored in the first security module, to a diversification key stored in the network access profile.

In this alternative embodiment, the diversification key is included in the network access profile and is used within the security module to generate the encryption key.

In one embodiment, where the logic communication channel is secure, the method further comprises the following steps, implemented by the second security module:

checking the integrity of the encrypted received network access data packet of the first security module; and checking the integrity of the encrypted received encryption key of the first security module.

The invention also relates to a security module, called first security module, included in a first mobile equipment, said first security module comprising a network access profile, a second equipment comprising a security module, called second security module, said first and said second security module being adapted to establish a logic communication channel, said security module comprising:

means for generating a secret key, designed to generate a secret key;

means for encrypting and sending, designed to encrypt a data packet associated with the network access profile by means of said secret key, and to send said encrypted packet to the second security module through the logic communication channel;

receiving means, designed to receive an acknowledgement of receipt from the second security module representing the correct reception of said encrypted data packet;

deleting means, designed to delete the data packet associated with the network access profile; and sending means designed to send said secret key to the second security module through the logic communication channel.

In one embodiment, the security module further comprises:

second receiving means, designed to receive the encrypted data packet associated with the network access profile;

sending means, designed to send the acknowledgement of receipt representing the correct reception of said encrypted data packet;

third receiving means, designed to receive the secret key;

decrypting means, designed to decrypt the encrypted data packet by means of the received secret key.

In this embodiment, the mobile equipment, associated with a security module, is designed, on the one hand, to initiate a transfer of a network access profile to a security module associated with another mobile equipment and, on the other hand, to receive an access profile from another mobile equipment associated with a security module.

The invention also relates to a program for a security module associated with mobile equipment, comprising program code instructions intended to control the execution of the steps of the method for protecting a network access profile against cloning as described above, when the program is executed on said equipment associated with said module.

The invention also relates to a data medium, in which the aforementioned program is stored.

The invention also relates to a mobile equipment comprising a security module as described above.

BRIEF DESCRIPTION OF THE DRAWINGS

Further features and advantages of the present invention will be better understood from the detailed description and from the accompanying figures, in which.

DETAILED DESCRIPTION OF ILLUSTRATIVE EMBODIMENTS

Figure 1:
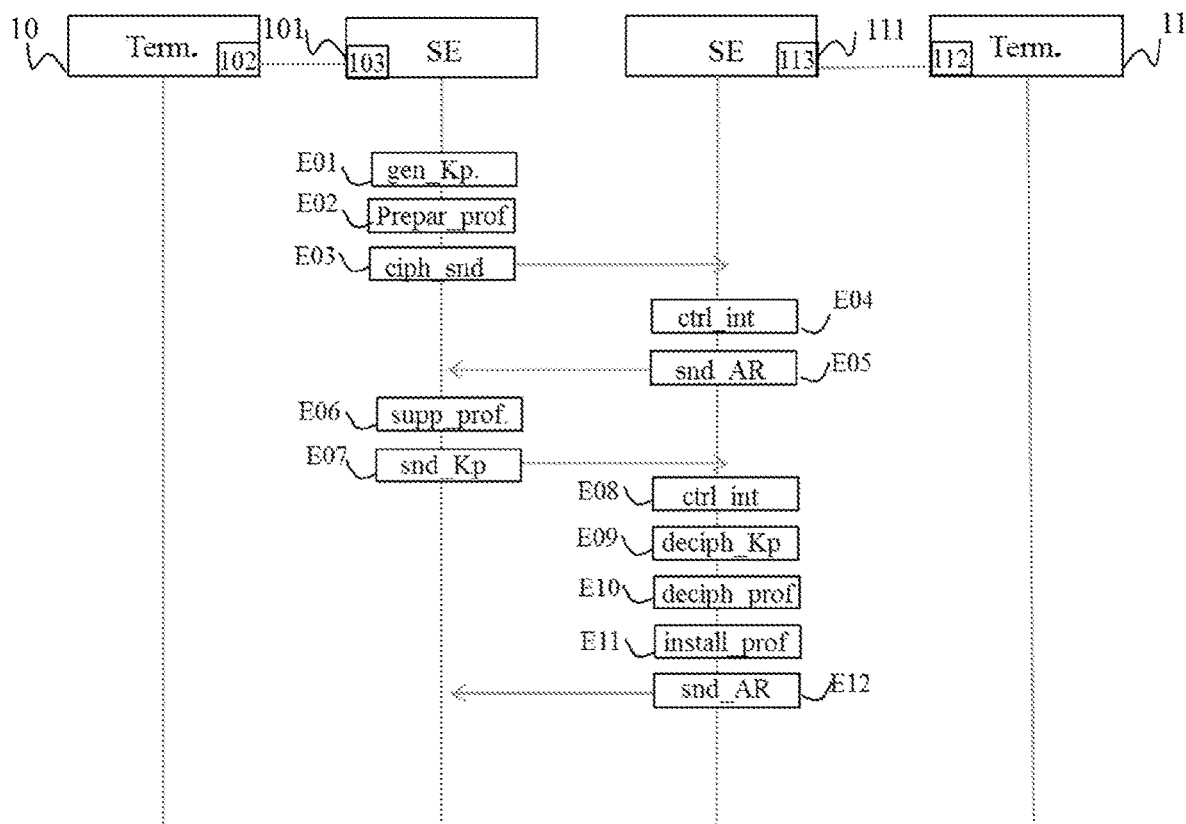
FIG. 1 shows the steps of a method for protecting a network access profile against cloning, according to one embodiment.

The steps of a method for protecting a network access profile against cloning, according to a first embodiment, will now be described in relation to FIG. 1.

A first mobile equipment 10 of a user (the user is not shown in FIG. 1), for example, a mobile terminal or a tablet, is equipped with a security module 101, for example, an on-board, and therefore potentially irremovable, module, such as an "eSIM" ("embedded Subscriber Identity Module") module of the eUICC ("embedded Universal Integrated Circuit Card") type. The security module 101 comprises a public key certificate specific thereto, with the public key being associated, by computation, with a private key stored on the security module 101. The certificate complies with, for example, the X.509 v3 standard; it was issued by a trusted authority and has been installed, for example, on the security module 101, as well as the associated private key, in the factory. The public key certificate can be specific to the cloning protection method. In another embodiment, it is also designed to implement other trusted operations in the network, not described herein. The security module 101 of the first mobile equipment also comprises a network access profile associated with a service offer for which the user has a subscription with an operator (not shown in FIG. 1). It is assumed that the user has activated their network access profile, in other words that the profile is adapted to access the network.

A second mobile equipment 11 comprises an on-board security module 111. Like the security module 101, the security module 111 also comprises a public key certificate specific thereto, with the public key being associated, by computation, with a private key stored on the security module 111.

For the sake of simplicity, the security module 101 of the first mobile terminal 10 also can be called "first security module 101". Similarly, the security module 111 of the second mobile equipment 11 also can be called "second security module 111".

The first and second mobile equipment 10, 11 each comprise a software application 102, 112, providing the mobile equipment with profile management functionality. This software application comprises code instructions designed to implement the steps of the method described herein, and which are implemented by the mobile equipment 10, 11. In one embodiment, this application is integrated into an "LPA" ("Local Profile Assistant") type profile, or local manager profile, usually designed to request and retrieve a network access profile from a data server of an operator via a secure Internet connection, and to control its installation and its activation on the security module.

The first and the second security module 101, 111 each comprise a software application 103, 113, interfaced with the application 102, 112 of the associated mobile equipment 10, 11. This application comprises code instructions designed to implement the steps of the method for protecting a network access profile against cloning that are implemented by the security modules 101, 111.

The method for protecting a network access profile against cloning is illustrated herein in the context of transferring a network access profile of the security module 101 of the first mobile equipment 10 to the security module 111 of the second mobile equipment 11. In another embodiment, not described, it can be implemented when transferring a security profile from a first security module to a second security module of the same mobile equipment.

It is assumed that, prior to the steps of the method described herein, a logic control channel has been established, in accordance with a known method, between the security module 101 of the first mobile equipment 10 and the security module 111 of the second mobile equipment 11.

In the embodiment described herein, the logic communication channel is secure. It is thus authenticated, and protected in terms of confidentiality and integrity. Such a secure channel is established in accordance with a known method, for example, based on the TLS ("Transport Layer Security") protocol or on the DTLS ("Datagram Transport Layer Security") protocol. Establishing the secure logic communication channel involves mutual authentication between the two security modules 101, 111. In this example, establishing the secure communication logic channel uses the public key certificates included in the security modules 101, 111. It should be noted that the secure communication logic channel is established between the two security modules 101, 111. Thus, the end-to-end security of a data transfer between the two security modules is guaranteed. The two security modules 101, 111 have implemented mutual authentication specific to TLS or to DTLS on the basis of exchanges of messages in accordance with the protocol used for establishing the secure logic communication channel.

In another embodiment, not shown in FIG. 1, the logic communication channel established between the two security modules is not secure. This embodiment can be implemented, for example, in a controlled environment, in other words a secure environment, for example, in an environment offered and managed by the network operator.

In an initial key generation step E01, the first security module 101 generates a secret key Kp intended to be used by a secret key encryption algorithm to encrypt data. In the cloning protection method, the secret key Kp is intended to encrypt the data of the profile to be transferred that is extracted from the security module 101. It is also intended to be subsequently used by the second security module 111 in order to decrypt the data of the encrypted profile.

In a first embodiment, the generation of the secret key Kp is based on the method for generating random keys integrated in the security modules, called "OBKG" (OnBoard Key Generation"). This method is appreciated by a network operator since the security is based on the security of the security module only.

In another embodiment, a diversification key stored in the network access profile when it is installed on the security module 101 is used as a parameter of a key diversification algorithm included in the security module 101 in order to generate the secret key Kp.

In a subsequent step E02 of preparing data of the profile, the first security module 101 extracts the data corresponding to the network access profile to be transferred and generates a packet, or "package", of data to be transferred that corresponds to the access profile to be transferred. Preparing the data of the profile involves formatting the data of the profile so as to obtain a data packet designed to be interoperable with other security modules.

In a subsequent encrypting and sending step E03, the security module 101 of the first mobile equipment 10 encrypts the data packet to be transferred by applying an encryption algorithm configured by the secret key Kp generated during step E01. It then sends the encrypted data packet to the security module 111 of the second mobile equipment 11. The encrypted data packet of the profile to be transferred is received by the security module 111 of the second mobile equipment 11 at the end of step E03. It should be noted that the security module 111 of the second mobile equipment 11 is not able to decrypt the received encrypted data packet. Indeed, it does not have the secret key Kp. At this stage, a single network access profile exists and is likely to be active in the network: the one that is included in the security module 101 of the first mobile equipment 10.

In the embodiment described herein, where the logic communication channel established between the two security modules 101, 102 is secure, the data of the profile to be transferred are protected, on the one hand, by encryption by means of the secret key Kp and, on the other hand, by encryption inherent in the secure communication channel. Moreover, the data packet of the transferred profile benefits from an integrity check inherent in the established secure communication channel.

In a subsequent integrity checking step E04, the security module 111 of the second mobile equipment 11 implements integrity checking of the encrypted data packet. This integrity checking is intended to ensure that the received encrypted data packet is identical to the encrypted data packet sent by the security module 101 of the first mobile equipment 10 during step E03 and that it has not been altered during the transfer between the first security module 101 and the second security module 111. Integrity checking is implemented in accordance with a known method for verifying an authentication code of the HMAC (Hash-based Message Authentication Code) type specific to the security protocol used to establish the secure communication channel.

It should be noted that the integrity checking step E04 is not implemented when the logic communication channel is not secure.

In the embodiment described herein, where integrity checking is implemented during step E04 and where this checking is negative, indicating that the encrypted data packet of the received profile has been altered, the method stops. In this case, during a step not shown in FIG. 1, a message is displayed on the screen of the first mobile equipment 10 for the attention of the user, notifying them of the failure of the current procedure, for example, the transfer of the access profile.

In a subsequent step E05 of sending an acknowledgement of receipt, the second security module 111 sends an acknowledgement of receipt of the encrypted data packet to the first security module 101, acknowledging the correct reception of the packet.

In the embodiment described herein, where the logic communication channel is secure, the acknowledgement of receipt includes an indicator of the result of the integrity checking of the data implemented in the integrity checking step E04.

In a step E06 of deleting the profile, implemented after receiving the acknowledgement of receipt, the first security module 101 deletes the network access profile that it had stored.

It should be noted that at this stage a single occurrence of the data packet corresponding to the network access profile exists, namely that stored in the security module 111 of the second mobile equipment 11. However, the data packet is encrypted and the second security module 111 does not have the secret key Kp for the decrypting thereof. Thus, at this stage it is not possible to access the network in accordance with the service offer associated with the access profile, which for the time being is unusable.

In a subsequent step E07 of sending the secret key, the first security module 101 sends the secret key Kp to the second security module 101 via the previously established logic communication channel. The secret key Kp is received by the second security module 101 at the end of step E07.

In the embodiment described herein, where the logic communication channel between the two security modules 101, 111 is secure, the secret key Kp is securely transmitted by means of encryption inherent in the secure logical channel. In the case whereby the logic communication channel is not secure, the secret key Kp is plainly transmitted to the second security module 111.

In a subsequent step E08 of checking the integrity of the secret key, the integrity of the received encrypted secret key Kp is checked. The integrity checking is implemented by the second security module 111 by verifying an HMAC authentication code inherent in the security of the communication channel. In the case whereby the integrity checking is negative, indicating that the transmitted encrypted secret key Kp has been altered during its transmission, the method stops. In this case, during a step not shown in FIG. 1, a message is displayed on the screen of the second mobile equipment 11 for the attention of the user, notifying them of the failure of the current procedure, for example, the transfer of the access profile.

It should be noted that this step is not implemented when the logic communication channel is not secure.

In a step E09 of decrypting the secret key, the secret key Kp is decrypted. The secret key Kp is decrypted by means of the data inherent in the secure communication logic channel. At the end of step E09, the second security module 111 has the secret key Kp.

It should be noted that this step is not implemented when the logic communication channel is not secure. In this case, the secret key Kp is not actually encrypted.

In a step E10 of decrypting the encrypted data packet, the second security module 111 proceeds with the decryption of the encrypted data packet of the profile received during step E03. To this end, it uses the secret key Kp as the parameter of the encryption algorithm used to encrypt the data of the profile. At the end of step E10, the security module 111 of the second mobile equipment 11 has data relating to the network access profile extracted from the security module 101 of the first mobile equipment 10 during the step E02 of preparing the data of the profile.

Thus, at the end of the decryption step E10, only the security module 111 of the second mobile equipment 11 has the data packet corresponding to the network access profile.

In a subsequent step E11 of installing the profile, the second security module 111 installs and activates the network access profile. For example, the profile manager LPA, not shown in FIG. 1, controls the installation and activation of the profile on the second security module 111.

In a step E12 of sending an optional acknowledgement of receipt, the security module 111 of the second mobile equipment 11 sends a message to the security module 101 of the first mobile equipment 11 notifying it of the correct installation and of the correct activation of the network access profile. This message is transmitted to the first mobile equipment 10 and/or to the second mobile equipment 11 in order to notify the user of the correct execution of the transfer of the network access profile within the context of the current procedure. This step is optional as the user can be notified of the correct installation and activation of the network access profile via the second mobile equipment 11.

It should be noted that in the event of a problem during the method for securely transferring the network access profile, the user may no longer have their network access profile. In this case, the operator may be called upon to proceed with the installation and the activation of their profile on the second mobile equipment 11. In any case, no clone of the access profile exists and the security of the network is never in question.

The method for protecting an access profile against cloning, as described above, is easily integrated in other methods, such as, for example, a method for securely transferring an access profile from a first mobile equipment to a second mobile equipment. In this example, and during the previous steps (not shown), the two mobile equipments 10 and 11 can pair in accordance with a known method, then the two security modules 101 and 102 of the two mobile equipments 10 and 11 can establish a secure communication logic channel in order to then initiate the transfer of the network access profile from the first security module to the second security module, as described above. Such a method thus advantageously can be used for a user to themselves transfer, in other words without contacting the operator, their network access profile to a security module included in a second equipment that they have recently acquired.

Figure 2:
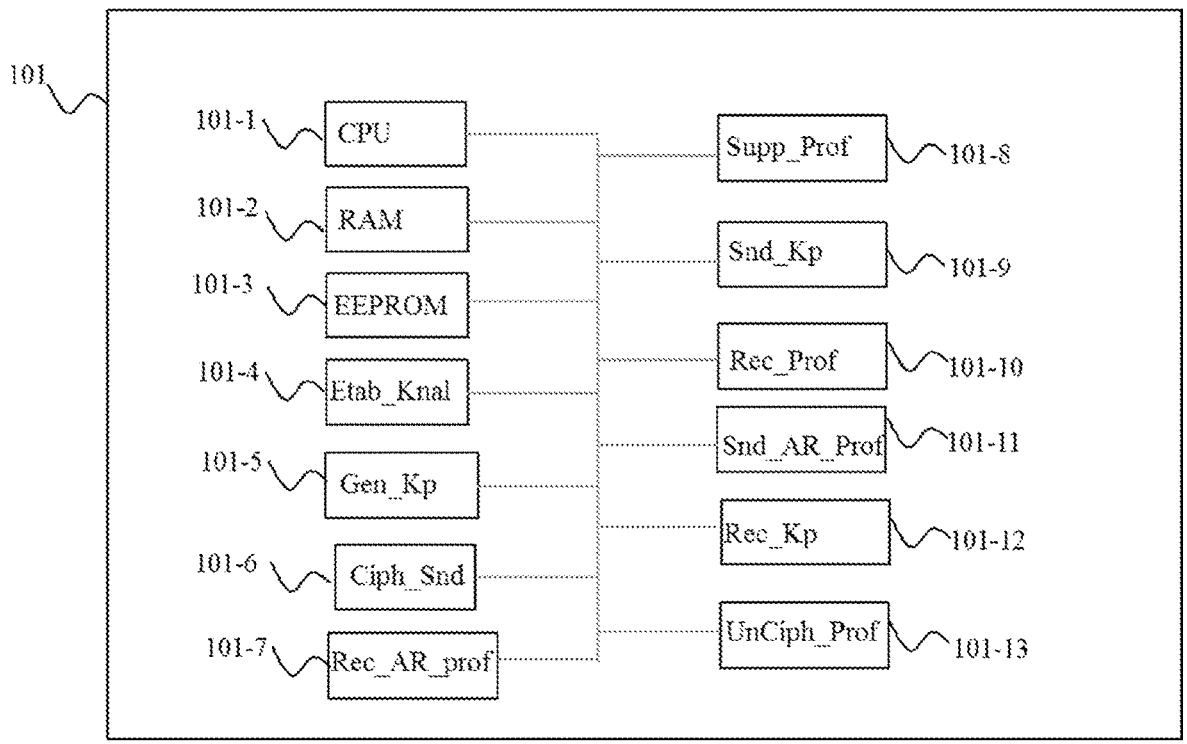
FIG. 2 is a schematic representation of a security module associated with a mobile equipment, capable of implementing the steps of the method for protecting a network access profile against cloning, according to one embodiment.

A security module 101, able to implement the steps of the method for protecting a network access profile against cloning as described above, will now be described in relation to FIG. 2.

The security module 101 is, for example, an embedded SIM card of the eUICC type. It should be noted that the security module 101 described herein is equally able to initiate the transfer of an access profile that it stores and to receive such a profile. Thus, the security module 101 described herein equally implements the steps of the method described above and implemented by the first security module 101 and those implemented by the second security module 111.

The security module 101 comprises:

- a processing unit or processor 101-1, or "CPU" ("Central Processing Unit"), intended to load instructions in a memory, to execute them, to perform operations;
- a set of memories, including a volatile memory 101-2, or "RAM" ("Random Access Memory") used to execute code instructions, to store variables, etc., and a storage memory 101-3 of the "EEPROM" ("Electrically Erasable Programmable Read Only Memory") type. In particular, the storage memory 101-3 is designed to store a software module that comprises code instructions for implementing the steps of the method for protecting a network access profile against cloning as described above and that are implemented by the security module 101. The storage memory 101-3 is also designed to store the private key associated with the public key certificate and the network access profile in a secure zone. The volatile memory 101-2 is also designed to store the secret key Kp generated during step E01. The security module 101 also comprises an interface for communicating with the mobile equipment 10, not shown in FIG. 2.

The security module 101 also comprises:

- a module 101-4 for establishing a logic communication channel, designed to establish a logic communication channel with a security module of a second mobile equipment, to which it is intended to transfer the network access profile. In the embodiment described herein, the logic channel is secure, thus providing an authenticated channel, which is protected in terms of confidentiality and integrity. In this embodiment, the module 101-4 for establishing a logic communication channel integrates software modules (not shown) able to implement mutual authentication between the security module 101 and the second security module 102, as well as encryption of the data transmitted over the channel and integrity checking of the data transmitted over the channel. The module 101-4 implements one of the previous steps (not shown in FIG. 1);
- a module 101-5 for generating a secret key, designed so that the security module 101 generates the secret key Kp intended to be used to encrypt the data packet associated with the data of the profile to be transferred. The generation module 101-5 is designed to implement the step E01 of generating the secret key of the method for protecting a profile against cloning as described above;
- an encrypting and sending module 101-6, designed to encrypt a data packet associated with the network access profile by means of said secret key, and to send said encrypted packet to the second security module through the logic communication channel. The encrypting and sending module 101-6 is designed to implement step E03 of the method for protecting a profile against cloning as described above;
- a receiving module 101-7, designed to receive an acknowledgement of receipt from the second security module, representing the correct reception of said encrypted data packet. The receiving module 101-7 is designed to implement step E05 of the method for protecting a profile against cloning as described above; and
- a deleting module 101-8, designed to delete the data packet associated with the network access profile. The deleting module 101-8 is designed to implement step E06 of the method for protecting a profile against cloning as described above;
- a sending module 101-9, designed to send said secret key to the second security module through the logic communication channel. The sending module 101-9 is designed to implement step E07 of sending the secret key of the method for protecting a profile against cloning as described above.

The module 101-4 for establishing a logic communication channel, the module 101-5 for generating a secret key, the encrypting and sending module 101-6, the receiving module 101-7, the deleting module 101-8 and the sending module 101-9 are preferably software modules comprising software instructions for implementing the steps of the method for protecting a network access profile against cloning as described above.

In one embodiment, where the security module 101 acts as the second security module 102, the security module 101 also comprises:

- a module 101-10 for receiving the encrypted data packet associated with the network access profile. The module 101-10 is designed to implement step E03 of the method for protecting a network access profile against cloning as described above, when the step is implemented by the second security module;
- a module 101-11 for sending an acknowledgement of receipt, designed to send the acknowledgement of receipt representing the correct reception of said encrypted data packet. The sending module 101-11 is designed to implement step E05 of the method for protecting a network access profile against cloning as described above;
- a second receiving module 101-12, designed to receive the secret key. The second receiving module 101-12 is designed to implement step E07 of the method for protecting a network access profile against cloning as described above;
- optionally a module for sending an acknowledgement of receipt (not shown in FIG. 2). This module is designed to confirm, with the first security module 101, the correct reception of the encrypted packet associated with the network access profile, the correct encryption of the encrypted packet and the correct installation and activation on the security module 101 of the profile obtained by decrypting the encrypted packet.

The invention also relates to:

- a program for a security module associated with mobile equipment, comprising program code instructions intended to control the execution of the steps of the method for protecting a network access profile against cloning as described above, when the program is executed on said security module;
- a readable recording medium, on which the program described above is stored.

The invention also relates to a mobile equipment that comprises a security module as described above.

Although the present disclosure has been described with reference to one or more examples, workers skilled in the art will recognize that changes may be made in form and detail without departing from the scope of the disclosure and/or the appended claims.

The invention claimed is:

1. A method for protecting a network access profile against cloning, a first mobile equipment comprising a security module, called "first security module", said first security module comprising said network access profile, a second mobile equipment being designed to receive said network access profile, said second mobile equipment comprising a security module, called "second security module", with said first security module, and respectively said second security module, being designed to establish a logic communication channel with the second security module, and respectively the first security module, said method being implemented by the first security module and comprising:

generating a secret key;

encrypting, by using said secret key, a data packet associated with the network access profile, and sending said encrypted packet to the second security module through the logic communication channel;

receiving an acknowledgement of receipt from the second security module representing a correct reception of said encrypted data packet; and upon reception of the acknowledgement from the second security module, deleting the data packet associated with the network access profile stored in the first security module of the first mobile equipment, and subsequently sending the secret key, for decryption of the encrypted data packet associated with the network access profile, to the second security module through the logic communication channel.

2. The method for protecting a network access profile against cloning as claimed in claim 1, comprising the following steps, implemented by the second security module:

receiving the encrypted data packet associated with the network access profile;

sending an acknowledgement of receipt acknowledging the correct reception of the encrypted packet;

receiving the secret key, for decryption of the encrypted data packet associated with the network access profile; and decrypting the encrypted data packet by means of the received secret key.

3. The method for protecting a network access profile against cloning as claimed in claim 1, wherein the logic communication channel is a secure channel.

4. The method for protecting a network access profile against cloning as claimed in claim 1, wherein the secret key is generated in accordance with a method for generating keys in a security module integrated in the first security module.

5. The method for protecting a network access profile against cloning as claimed in claim 1, wherein the secret key is generated by applying a key diversification algorithm, stored in the first security module, to a diversification key stored in the network access profile.

6. The method for protecting a network access profile against cloning as claimed in claim 2, further comprising the following steps, implemented by the second security module:

checking integrity of the encrypted received network access data packet of the first security module; and checking integrity of the received secret key of the first security module.

7. A security module, called first security module, included in a first mobile equipment, said first security module comprising a network access profile, a second equipment comprising a security module, called second security module, said first and said second security modules being adapted to establish a logic communication channel, said first security module comprising:

a processor; and at least one memory comprising instructions stored thereon which when executed by the processor configure the first security module to implement a method comprising:

generating a secret key;

encrypting a data packet associated with the network access profile by using said secret key, and sending said encrypted packet to the second security module through the logic communication channel;

receiving an acknowledgement of receipt from the second security module representing a correct reception of said encrypted data packet;

upon reception of the acknowledgement from the second security module, deleting the data packet associated with the network access profile; and subsequently sending said secret key, for decryption of the encrypted data packet associated with the network access profile, to the second security module through the logic communication channel.

8. The security module as claimed in claim 7, wherein the security module included in the first mobile equipment is further configured to implement a respective second security module with respect a respective first security module included in the second equipment, and the instructions further configure the security module included in the first mobile equipment to:

receive a respective second encrypted data packet associated with a respective second network access profile from the first security module included in the second equipment;

send a respective second acknowledgement of receipt representing a correct reception of said respective second encrypted data packet from the first security module included in the second equipment;

receive a respective second secret key from the first security module included in the second equipment;

decrypt the respective second encrypted data packet by using the received respective second secret key.

9. A non-transitory computer readable data medium, in which program code instructions are stored which when executed by a processor of a first security module included in a first mobile equipment configure the first security module to control execution of a method for protecting a network access profile against cloning, said first security module comprising said network access profile, a second mobile equipment being designed to receive said network access profile, said second mobile equipment comprising a second security module, and said first security module, and respectively said second security module, being designed to establish a logic communication channel with the second security module, and respectively the first security module, said method comprising:

generating a secret key;

encrypting, by using said secret key, a data packet associated with the network access profile, and sending said encrypted packet to the second security module through the logic communication channel;

receiving an acknowledgement of receipt from the second security module representing a correct reception of said encrypted data packet; and upon reception of the acknowledgement from the second security module, deleting the data packet associated with the network access profile, and subsequently sending the secret key, for decryption of the encrypted data packet associated with the network access profile, to the second security module through the logic communication channel.

10. A mobile equipment comprising the security module as claimed in claim 7.

\* \* \* \* \*